Figure 1:
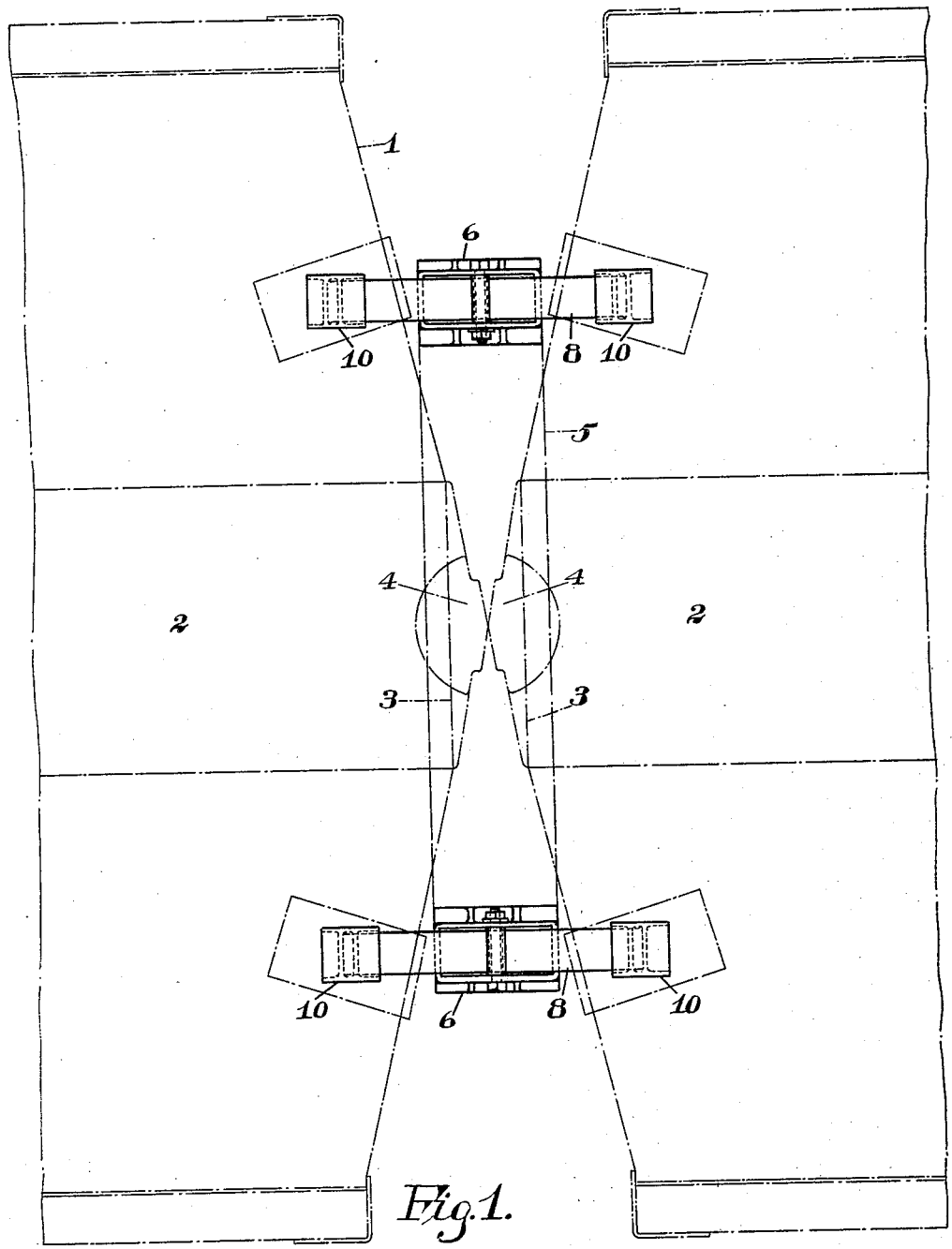

March 14, 1933.  F. J. SUNDHOLM  1,901,675
SIDE BEARING
Filed Nov. 6, 1930   2 Sheets-Sheet 1

INVENTOR
Frans J. Sundholm
BY
ATTORNEY

March 14, 1933. F. J. SUNDHOLM 1,901,675
SIDE BEARING
Filed Nov. 6, 1930 2 Sheets-Sheet 2
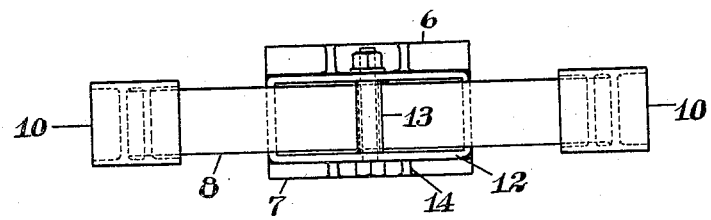
Fig. 3.
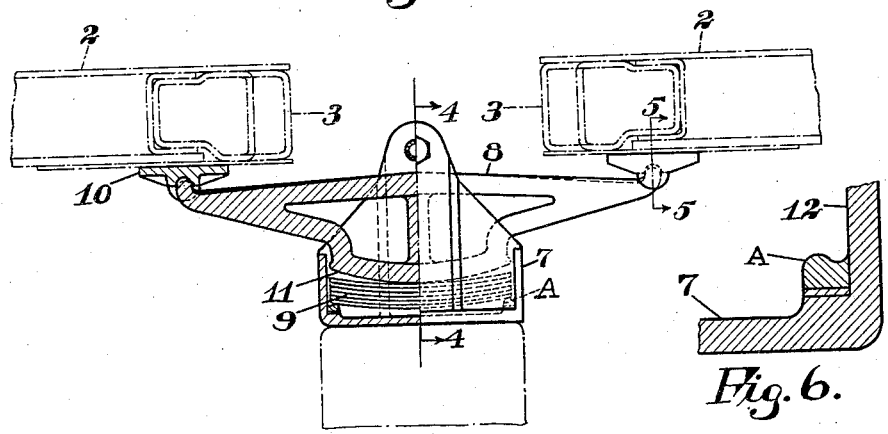
Fig. 2.
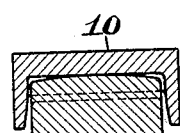
Fig. 6.
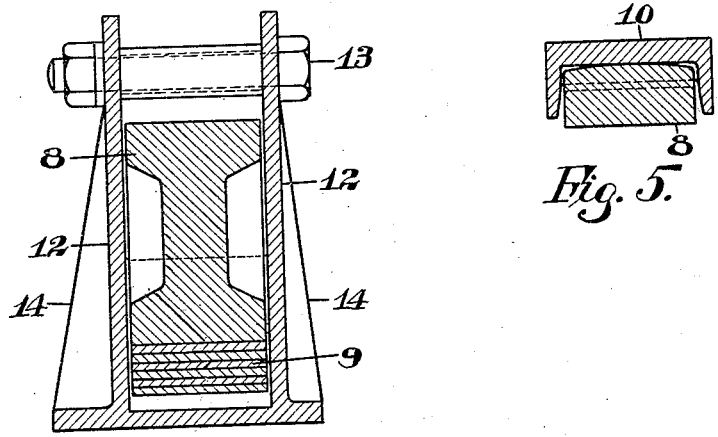
Fig. 4.
Fig. 5.
INVENTOR
Frans J. Sundholm
BY
ATTORNEY Patented Mar. 14, 1933

1,901,675

UNITED STATES PATENT OFFICE

FRANS JOEL SUNDHOLM, OF BELLEVUE, PENNSYLVANIA, ASSIGNOR TO PRESSED STEEL CAR COMPANY, OF PITTSBURGH, PENNSYLVANIA, A CORPORATION OF NEW JERSEY

SIDE BEARING

Application filed November 6, 1930. Serial No. 493,774.

This invention relates to transportation cars and particularly to railway cars of the articulated unit type in which each unit comprises a plurality of car bodies, the adjacent ends of two of which are carried by a single truck and has for an object the provision of side supports or bearings between the truck and the adjacent ends of two of the bodies of the car unit.

Another object of the invention is to provide a side bearing for an articulated car which comprises a member extending between and at its ends engaging with the adjacent ends of two bodies of the car and between its ends engaging an adjacent car truck.

A further object of my invention is to provide a side bearing for an articulated car unit which will be equally effective when the ends of the two bodies are in the same or different horizontal planes.

Referring now to the drawings where like reference characters refer to like parts, Fig. 1 is a plan view of the adjacent ends of two car bodies of an articulated unit showing the relation of the side bearings to the car bodies and truck; Fig. 2 is a view taken along the lines 2—2 of Fig. 1 and showing in enlarged detail the side bearing; Fig. 3 is a plan view of Fig. 2; Fig. 4 is a section taken along the lines 4—4 of Fig. 2; Fig. 5 is a section taken along the lines 5—5 of Fig. 2 and shows in detail the connection between the side bearing and side bearing shoes; Fig. 6 is an enlarged detail at the point A of Fig. 2.

Referring now in detail to the drawings, reference character 1 indicates an articulated car unit comprising a plurality of car bodies 2, the adjacent portions 3 of two of which bodies have been shown in the drawings. These ends 3 are provided with body center plates 4, both of which engage a truck center plate mounted on the truck bolster 5 which bolster is part of the truck. The center plates 4 engage with the truck in such a manner as to permit the bodies 3 of the unit to move freely relative to each other and to the truck as the unit rounds a curve or when the body sways from side to side.

On each side of the longitudinal line of the bodies 2 a side bearing member 6 is provided, which intermediate its ends is supported on the truck bolster. The base 7 of the side bearing, being mounted on the truck bolster and moving in unison therewith, forms a guide for the longitudinally extending arm 8 which is resiliently supported in the base 7 by means of leaf springs 9. The longitudinally extending arm 8 extends beneath the car bodies into the vertical plane of each body and has mounted at each end thereof shoes 10 which engage with wear plates on the underside of the bodies. The lower portion of the member 8 which engages with the resilient members 9 has an arcuate face 11 so as to permit the member 8 to have limited rotation in a vertical plane about the resilient bearings 9. The shoe members 10 on the ends of the arm 8 loosely engage the ends of the arms 8 and have arcuate bearing surfaces so as to have a limited rotation in a vertical plane about the arms 8. At each side of the base member 7 and spaced transversely of the arm 8 are guides 12 integrally formed with the base 7 and tied together above the member 8 by means of a bolt 13. These guides 12 are further reinforced by ribs 14 so as to resist the side thrust of the members 8 caused as the bodies round a curve or strike inequalities in the road bed.

It will be observed that when the adjacent car bodies of the articulated unit are in line the bodies are supported at their end portions by the body bearings 4 and the side bearings engaging with the bodies at each side of the ends thereof resist side-sway and hold the bodies in a horizontal plane. When the car bodies are in motion any tendency of side-sway in the car bodies is resiliently resisted by the arms 8 in engagement with the bodies and bearing on the resilient members 9.

There will be times during the operation of the car in which the adjacent ends of two adjacent car bodies will not be in the same horizontal plane and it will be readily seen by reference to Figs. 1 and 2 of the drawings that when such a condition takes place the arm 8 of the side bearing will rotate on its arcuate face 11 and in cooperation with the limited rotation of the shoe on the ends of the arm 8 adjust itself to the differences in elevation and function as efficiently as though the two adjacent ends were in the same horizontal plane.

By making the arm 8 rigid and placing the resilient member beneath the arm it will be evident that I have provided a side bearing of great strength and one which will not easily become broken and further, the resilient means are protected by the base and arm 8 against injury. The shoes 10 provided on the ends of the member 8 serve the double purpose of preventing wearing of the ends of the member 8 and maintaining smooth bearing surfaces as the body moves transversely relative to the arm 8 while rounding curves.

Having thus described the invention what I claim as new and desire to secure by Letters Patent is:

1. A side bearing for an articulated car comprising a base member, a member resiliently supported in said base member and extending beneath the car bodies and shoe members mounted on the ends of said resiliently supported member and engaging with the car bodies.

2. In a side bearing for the adjacent ends of two car bodies supported on a common truck, comprising a base member supported on the truck, a member extending between the car bodies in a direction longitudinal thereof and mounted in the base member, resilient means in the base member beneath the longitudinally extended member and shoe members mounted on the ends of the longitudinally extending member and in engagement with the car bodies.

3. A side bearing, for an articulated car, comprising in combination a base member mounted on the truck supporting the car bodies, a member mounted in the base member and supporting the adjacent ends of the car bodies, shoes mounted on the ends of said supporting member and engaging said bodies, resilient means mounted in the base member beneath the supporting member, said supporting member having a limited rotation in a vertical plane to accommodate vertical movement of the car bodies.

4. A side bearing, for the adjacent ends of two car bodies of an articulated unit, comprising in combination a base, a member mounted in the base and extending between the bodies in a direction longitudinally thereof, shoes mounted on the ends of the longitudinally extending member and in engagement with the car bodies, said longitudinally extending member having limited rotation in a vertical plane about the base member and resilient means mounted in the base providing a bearing for said longitudinally extending member.

5. A side bearing, for the adjacent ends of two car bodies of an articulated unit, comprising in combination a base member, an integral body supporting member extending beneath the bodies and into the vertical plane thereof, shoes mounted on the ends of the body supporting member and in engagement with the bodies and resilient means beneath the car supporting member, said means comprising a plurality of leaf springs mounted in the base member beneath the car supporting member and in spaced relation to the bottom of the base member.

6. A side bearing for an articulated car comprising a base member, a vertically movable, rockably mounted car supporting member, said car supporting member engaging with the underside of two adjacent bodies.

7. In a side bearing for an articulated unit in combination, a base member, a body supporting member common to adjacent bodies and pivotally mounted within the base member and resilient means between the base and the body supporting member.

8. In an articulated unit in combination, adjacent connected bodies, a truck common to both bodies, a side bearing common to both bodies and supported on the truck, the side bearing comprising a base member, a member mounted in the base member and connecting the bodies and shoe members between the bodies and the connecting member, the connection between the shoe and the body connecting members permitting longitudinal and transverse rotation of the shoe members relative to the body connecting member.

9. A side bearing for an articulated car comprising a rigid member common to both of the adjacent connecting bodies, a base member and means connecting the common body member to the bodies and to the base member, said means permitting longitudinal and transverse movement of the bodies relative to the bearings and to each other.

10. A side bearing for an articulated unit comprising a base member, a member common to both adjacent connecting bodies and resilient means between said members.

FRANS J. SUNDHOLM.